United States Patent [19]

Kageyama

[11] Patent Number: 5,035,485
[45] Date of Patent: Jul. 30, 1991

[54] INTERFERENCE FILTER WITH SHARP CUTOFF CHARACTERISTICS

[75] Inventor: Hitoshi Kageyama, Azuchi, Japan

[73] Assignee: Minolta Camera Kabushiki Kaisha, Osaka, Japan

[21] Appl. No.: 455,969

[22] Filed: Dec. 21, 1989

[30] Foreign Application Priority Data

Dec. 23, 1988 [JP] Japan ............................ 63-325426

[51] Int. Cl.$^5$ ............................................... G02B 5/28
[52] U.S. Cl. ..................................... 350/164; 350/166
[58] Field of Search .................................. 350/164, 166

[56] References Cited

U.S. PATENT DOCUMENTS

| | | | |
|---|---|---|---|
| 4,461,532 | 7/1984 | Sato et al. | 350/166 |
| 4,714,308 | 12/1987 | Sawamura et al. | 350/166 |
| 4,726,655 | 2/1988 | Mahlein | 350/166 |
| 4,756,602 | 7/1988 | Southwell et al. | 350/166 |
| 4,770,496 | 9/1988 | Mahlein | 350/166 |
| 4,784,467 | 11/1988 | Akatsuka et al. | 350/166 |
| 4,854,670 | 8/1989 | Mellor | 350/166 |

FOREIGN PATENT DOCUMENTS 63-61224 3/1988 Japan .

Primary Examiner—Bruce Y. Arnold
Assistant Examiner—Martin Lerner
Attorney, Agent, or Firm—Joseph W. Price

[57] ABSTRACT

An interference filter for use in a copying machine comprises a glass substrate and a plurality of high-refractive index and low-refractive index layers alternately superposed on the substrate for reducing ripples at opposite sides of the reflective range. The first and second layers counted from the substrate have a greater optical layer thickness than $\lambda o/2$. The third and fourth layers have a greater optical layer thickness than $\lambda o/4$. The second top layer has a greater optical layer thickness than $\lambda o/2$. The top layer has a smaller optical layer thickness than $\lambda o/4$. The remaining layers have an optical layer thickness equal to $\lambda o/4$.

9 Claims, 3 Drawing Sheets

INTERFERENCE FILTER WITH SHARP CUTOFF CHARACTERISTICS

BACKGROUND OF THE INVENTION

1. Field of the Invention

The present invention relates to a color separation filter for use in a color copier and, more particularly, a filter to improve sideband characteristics.

2. Description of the Prior Art

In an electrostatic copying system, a document placed on a transparent plate is illuminated by an appropriate illuminating device, and a document image is projected through a lens mounted on a copying optical path onto a uniformly charged photoconductive member for forming an electrostatic latent image thereon. This latent image is developed by applying thereto a powder toner charged to have opposite characteristics to the photoconductive member. The resulting toner image is thereafter transferred and fixed to copying paper, OHP paper, a postcard or the like. In recent years, vigorous developments have been made in the art of producing color copies with a color separation filter mounted on the optical path and a developing device having a plurality of developers including color toners corresponding to the color separation filter. The color separation filter plays a technically important part in such a color copying system, and is required to have high performance.

Generally, the color separation filter comprises an absorption filter which absorbs pigments, or an interference filter which interferes with light. The latter is often preferred in designing the color separation filter because of the greater freedom of designing and the higher efficiency of color separation.

In designing the interference filter, the following three conditions are first determined:

(1) the wavelength of the reflective range,
(2) the width of the reflective range, and
(3) the residual transmittance of the reflective range.

Assume here that the reflective range has a center wavelength $T\lambda o$, a width $\Delta\lambda o$ and a residual transmittance $T\lambda o$. The reflective range centering on wavelength $\lambda o$ is generated where, as shown in FIG. 3, dielectric elements having a high refractive index nH and those having a low refractive index nL are stacked each in an optical thickness $\lambda o/4$ on a substrate G. At this time, the width $\Delta\lambda o$ of the reflective range is determined by a ratio between the high refractive index nH and low refractive index nL. Conversely speaking, the width $\Delta\lambda o$ of the reflective range is controllable by the ratio between the high refractive index nH and low refractive index nL.

Further, the residual transmittance $T\lambda o$ of the reflective range is controllable by the number of stacked layers. That is, the residual transmittance $T\lambda o$ decreases with an increase in the number of layers.

This is illustrated in FIGS. 4 through 7.

The number of layers increases progressively from FIG. 4 to FIG. 7. In this state, the residual transmittance $T\lambda o$ of the reflective range decreases progressively from FIG. 4 to FIG. 7, with progressively larger ripples occurring at opposite sides of the reflective range. These ripples reduce the transmittance, to the detriment of the color separation filter performance.

FIG. 8 shows a conventional layer arrangement for reducing these ripples. This multi-layer interference filter includes, counted from the substrate G, a first layer S1 of a high-refraction dielectric element, a second layer S2 of a low-refraction dielectric element, a third layer S3 of the high-refraction dielectric element, and so on up to an Nth layer SN of the low refraction dielectric element. The first layer S1 and the last layer SN have an optical thickness $\lambda o/8$, respectively, while each of the other layers has an optical thickness $\lambda o/4$. This construction is effective for diminishing the ripples at the opposite ends of the reflective range as shown in FIG. 9.

However, the ripples do remain even with this construction, to such a degree to impair highly efficient color separation.

SUMMARY OF THE INVENTION

An object of the present invention is to improve the interference filter of the type noted above for reducing the ripples occurring in opposite transmission ranges of greater and smaller wavelengths across the non-transmission range, to enable highly efficient color separation.

The above object is achieved, according to the present invention, by an interference filter comprising a substrate for carrying a plurality, N, of layers superposed thereon, the layers including layers of a high-refractive index element arranged at odd-numbered places in order as counted from the substrate, and layers of a low-refractive index element arranged at even-numbered places in order as counted from the substrate, wherein the first layer counted from the substrate has a greater optical layer thickness than $\lambda o/2$, the second layer counted from the substrate has a greater optical layer thickness than $\lambda o/2$, the third layer counted from the substrate has a greater optical layer thickness than $\lambda o/4$, the fourth layer counted from the substrate has a greater optical layer thickness than $\lambda o/4$, the N−1th layer counted from the substrate has a greater optical layer thickness than $\lambda o/2$, and the Nth layer counted from the substrate has a smaller optical layer thickness than $\lambda o/4$.

The interference filter as constructed above is capable of drastically reducing the ripples at opposite sides of the reflective range, as evident from its spectral transmittance illustrated in FIG. 2.

The interference filter according to the present invention enables highly efficient color separation, now that only greatly diminished ripples occur in opposite transmission ranges of greater and smaller wavelengths across the non-transmission range or side bandwidth range.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 1 and 2 show an interference filter according to the present invention, in which:

FIG. 1 is an enlarged view of the interference filter of the present invention, and FIG. 2 is a graph showing spectral transmittance of the interference filter of FIG. 1.

FIGS. 3 through 9 show the basic concept of an interference filter and conventional interference filters, in which:

FIG. 3 is and enlarged view of a conventional interference filter,

FIGS. 4 through 7 are graphs showing variations in the spectral transmittance occurring with the interference filter of FIG. 3, FIG. 8 is a view of a conventional interference filter having a different layer construction for improved ripple characteristics, and FIG. 9 is a graph showing spectral transmittance of the interference filter of FIG. 8.

DESCRIPTION OF THE PREFERRED EMBODIMENT

Figure 1:
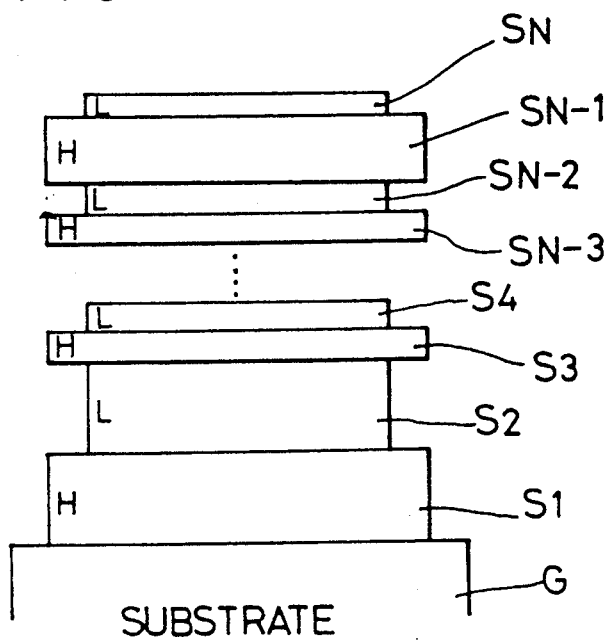

An embodiment of the present invention will be described hereinafter with reference to the drawings. FIG. 1 is a schematic enlarged view showing the construction of an interference filter according to the invention. This filter has a multi-layer construction including, counted from a glass substrate G, a first layer S1 of a high-refractive index dielectric element H, a second layer S2 of a low-refractive index dielectric element L, a third layer S3 of the high-refractive index dielectric element H, and so on up to an Nth layer SN of the low refractive index dielectric element L. The number of layers N in this embodiment is 20 to 40, preferably 30, to produce advantageous effects. Layer thicknesses of the high-refractive index and low refractive index dielectric elements H and L represent optical thickness. The high-refractive dielectric element may comprise titanium dioxide ($TiO_2$), zirconium dioxide ($ZrO_2$) or zinc sulfide (ZnS). The low-refractive index dielectric element may comprise silicon dioxide ($SiO_2$), magnesium or aluminum oxide ($Al_2O_3$).

The glass substrate has a refractive index of about 1.52.

The following table shows a specific arrangement according to this embodiment.

| layer | Substance | refractive index | thickness s |
|---|---|---|---|
| Substrate | Glass | 1.52 | |
| S1 | $ZrO_2$ | 2.05 | $2.96 \times \lambda o/4$ |
| S2 | $Al_2O_3$ | 1.63 | $2.96 \times \lambda o/4$ |
| S3 | $ZrO_2$ | 2.05 | $1.06 \times \lambda o/4$ |
| S4 | $Al_2O_3$ | 1.63 | $1.06 \times \lambda o/4$ |
| S5 | $ZrO_2$ | 2.05 | $\lambda o/4$ |
| S6 | $Al_2O_3$ | 1.63 | $\lambda o/4$ |
| SN-3 | $ZrO_2$ | 2.05 | $\lambda o/4$ |
| SN-2 | $Al_2O_3$ | 1.63 | $\lambda o/4$ |
| SN-1 | $ZrO_2$ | 2.05 | $2.24 \times \lambda o/4$ |
| SN | $Al_2O_3$ | 1.63 | $0.84 \times \lambda o/4$ |

According to the present invention, the first layer S1 of the high-refractive index element H having a greater layer thickness than $\lambda o/2$ is placed on the glass substrate G, and then the second layer S2 of the low-refractive index element L again having a greater layer thickness than $\lambda o/2$ is placed on the first layer S1. Then, the third layer of the high refractive index element H and the fourth layer of the low-refractive index element L, both having a greater thickness than $\lambda o/4$ are placed on top of the layers S1 and S2. The fifth to N−2th layers having a thickness $\lambda o/4$ are successively overlaid with the high-refractive index element H and low-refractive index element L arranged alternately. The uppermost layer SN of the low-refractive index element L has a thickness less than $\lambda o/4$, with the second highest layer SN−1 of the high-refractive index element H having a greater thickness than $\lambda o/2$.

Figure 2:
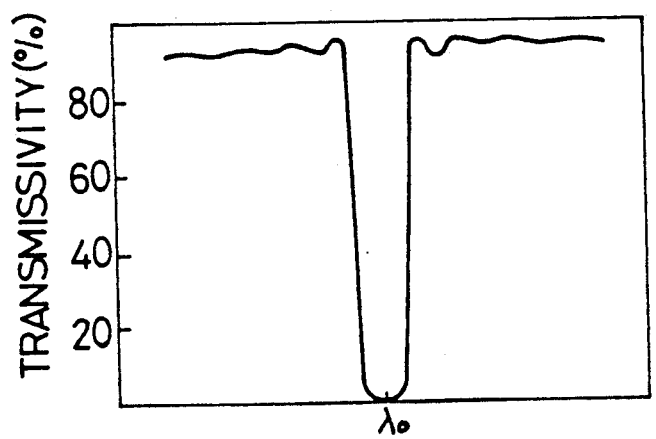
Figure 8:
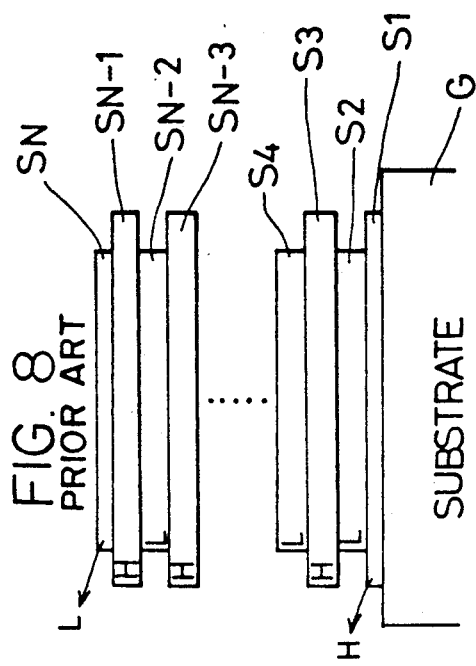
Figure 9:
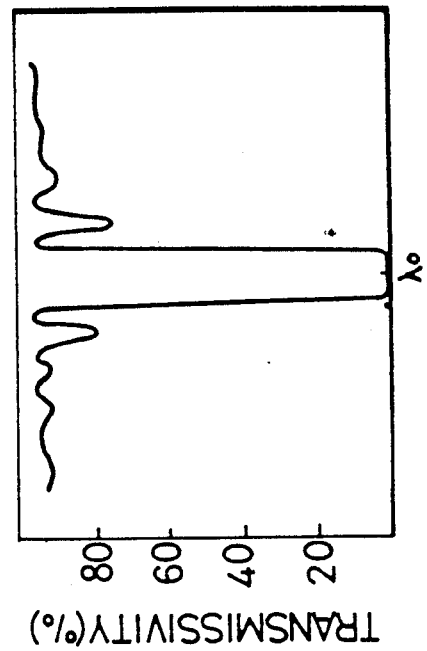
Figure 3:
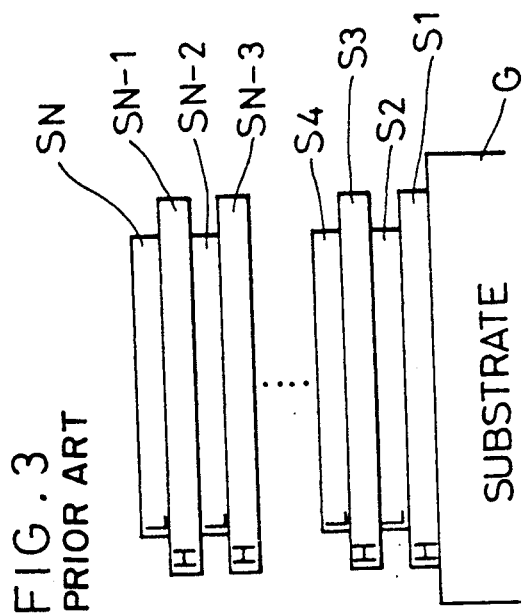
Figure 4:
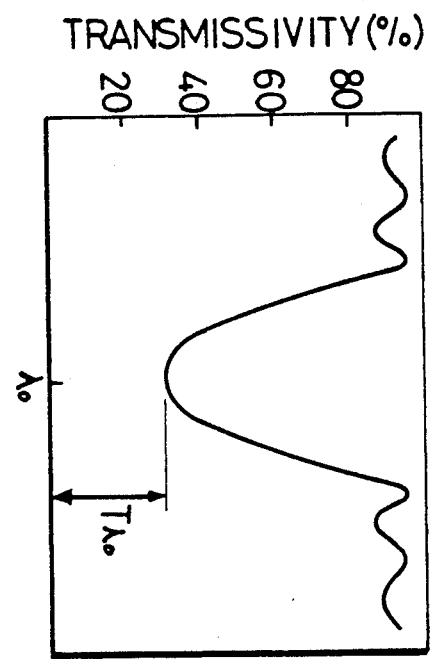
Figure 6:
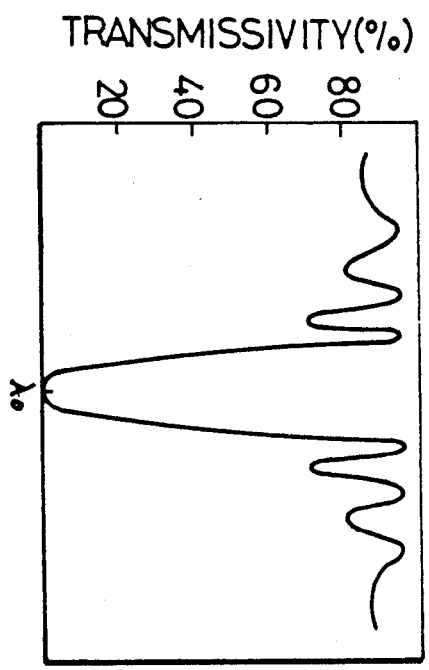
Figure 5:
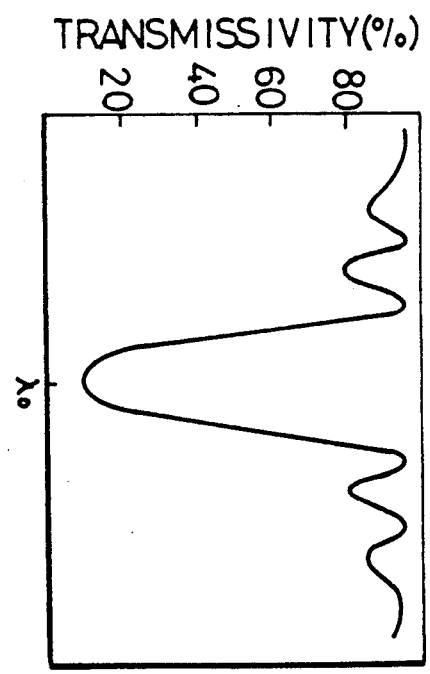
Figure 7:
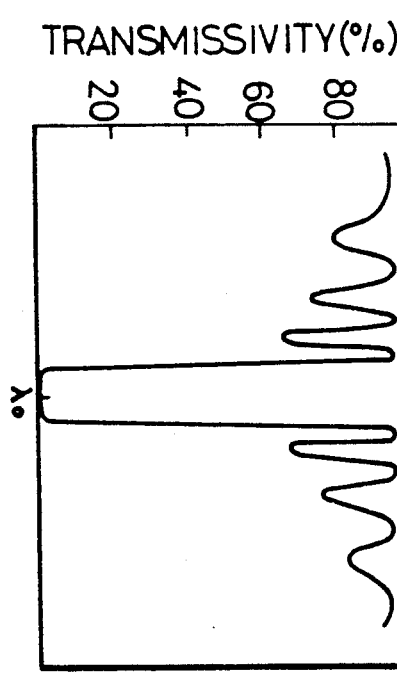

FIG. 2 is a graph showing spectral transmittance of the interference filter as constructed above. As seen from this graph, the ripples at the opposite sides of the absorption band range are significantly reduced as compared with the ripples shown in FIG. 9.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An interference filter for use in a copying machine to be positioned in an optical path of light passing through an image-forming lens for preventing transmission of light having a predetermined wavelength range about a wavelength, $\lambda o$, said interference filter comprising:

a substrate for carrying a plurality, N, of layers superimposed thereon;

said layers including layers of a high-refractive index element arranged at odd-numbered places in order as counted from said substrate, layers of a low-refractive index element arranged at even-numbered places in order as counted from said substrate, and the Nth layer as counted from said substrate being of a low-refractive index element;

wherein:

the first layer as counted from said substrate has an optical layer thickness greater than $\lambda o/2$, the second layer as counted from said substrate has an optical layer thickness greater than $\lambda o/2$, the third layer as counted from said substrate has an optical layer thickness greater than $\lambda o/4$, the fourth layer as counted from said substrate has an optical layer thickness greater than $\lambda o/4$, the N−1 layer as counted from said substrate has an optical layer thickness greater than $\lambda o/2$, and the Nth layer as counted from said substrate has an optical layer thickness smaller than $\lambda o/4$.

2. An interference filter as claimed in claim 1, wherein the fifth to N−2 layers counted from said substrate have an optical layer thickness equal to $\lambda o/4$.

3. An interference filter as claimed in claim 1, wherein the first layer has a greater optical layer thickness than the N−1 layer.

4. An interference filter comprising:

a substrate for carrying a plurality, N, of layers superimposed thereon;

said layers including layers of a high-refractive index element arranged at odd-numbered places in order as counted from said substrate, layers of a low-refractive index element arranged at even-numbered places in order as counted from said substrate, and the Nth layer as counted from said substrate being of a low-refractive index element;

wherein:

the first layer and a second layer as counted from said substrate have substantially the same optical layer thickness, the third layer and a fourth layer as counted from said substrate have substantially the same optical layer thickness, the N−1 layer as counted from said substrate has an optical layer thickness smaller than said first layer, the Nth layer as counted from said substrate has an optical layer thickness smaller than said fourth layer, and the remaining layers have substantially the same optical layer thickness which is between the optical layer thicknesses of said fourth layer and said Nth layer.

5. An interference filter as claimed in claim 4, wherein;

the optical layer thickness of the first and second layers is 2.96*$\lambda_o$/4, the optical layer thickness of the third and fourth layers is 1.06*$\lambda_o$/4, the optical layer thickness of the N−1 layer is 2.24*$\lambda_o$/4, the optical layer thickness of the Nth layer is 0.84*$\lambda_o$/4, and the optical layer thickness of the remaining layers is $\lambda_o$/4.

6. An interference filter as claimed in claim 5, wherein said substrate is formed of glass, said high-refractive index layers are formed of zirconium dioxide, and said low-refractive index layers are formed of aluminum oxide.

7. An interference filter as claimed in claim 5, wherein said substrate has a refractive index of 1.52, said high-refractive index layers have a refractive index of 2.05, and said low-refractive index layers have a refractive index of 1.63.

8. An interference filter as claimed in claim 5, wherein the number of layers superimposed on said substrate is 20 to 40, preferably 30.

9. An interference filter for use in a copying machine as mounted on an optical path of light passing through an image-forming lens for preventing transmission of light having a predetermined wavelength range about a design wavelength, $\lambda_o$, said interference filter comprising:

a substrate for carrying a plurality, N, of layers superimposed thereon;

said layers including layers of high-refractive index elements arranged at odd-numbered places in order as counted from said substrate, and layers of low-refractive index elements arranged at even-numbered places in order as counted from said substrate;

wherein:

the first layer as counted from said substrate has an optical layer thickness greater than $\lambda_o$/2, the second layer as counted from said substrate has an optical layer thickness greater than $\lambda_o$/2, the third layer as counted from said substrate has an optical layer thickness greater than $\lambda_o$/4, the fourth layer as counted from said substrate has an optical layer thickness greater than $\lambda_o$/4, the fifth to N−2 layers as counted from said substrate have an optical layer thickness equal to $\lambda_o$/4, the N−1 layer as counted from said substrate has an optical layer thickness greater than $\lambda_o$/2, and the Nth layer as counted from said substrate has an optical layer thickness smaller than $\lambda_o$/4.

* * * * *